Aug. 26, 1924.
E. H. SPECHT
COMBINED BUMPER AND LUGGAGE CARRIER
Filed Feb. 1, 1924
1,506,274
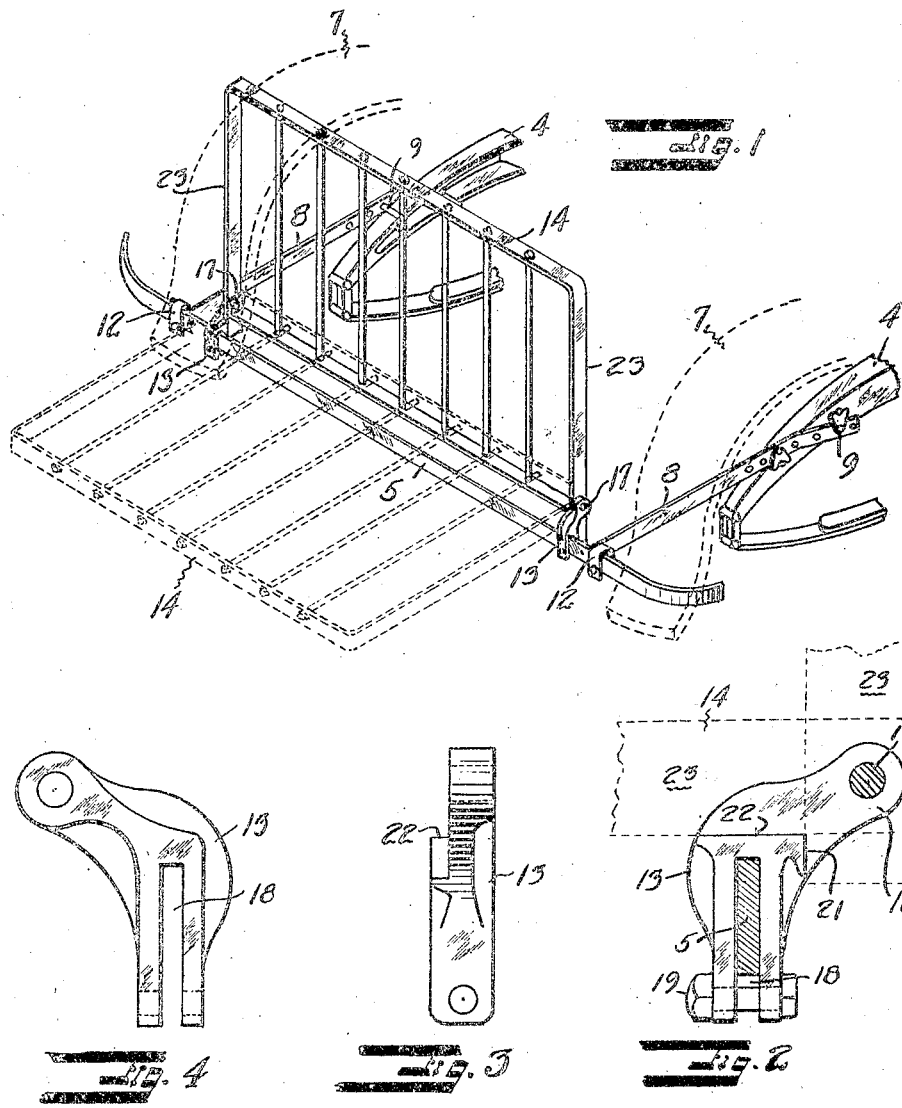
INVENTOR.
EDWARD H. SPECHT
BY Joseph B. Gardner
ATTORNEY.

Patented Aug. 26, 1924.

1,506,274

UNITED STATES PATENT OFFICE.

EDWARD H. SPECHT, OF OAKLAND, CALIFORNIA.

COMBINED BUMPER AND LUGGAGE CARRIER.

Application filed February 1, 1924. Serial No. 689,861.

*To all whom it may concern:*

Be it known that I, EDWARD H. SPECHT, a citizen of the United States, and a resident of Oakland, county of Alameda, and State of California, have invented a new and useful Combined Bumper and Luggage Carrier, of which the following is a specification.

My invention relates to a combined bumper and luggage carrier particularly adapted to be attached to the rear end of an automobile.

An object of the invention is to provide a combined bumper and luggage carrier in which the members are so constructed and related that the device may be readily secured to automobiles of different specifications without alteration of parts or change of size of the members.

Another object of the invention is to provide a combined bumper and carrier construction in which the carrier part may be detached from the bumper part after the device has been fixed to the automobile, leaving the bumper part to perform its usual function.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings:

Figure 1 is a perspective view of the device attached to the rear end of an automobile.

Figures 2, 3 and 4 are side and end views of one of the brackets to which the carrier is pivoted, a portion of the bumper bar and carrier being shown in connection with Figure 2.

As previously stated, the device of my invention is particularly designed for attachment to the rear end of an automobile, and in its present embodiment is adapted to be secured to the longitudinal frame members 4 of the automobile. The device includes a bar 5 which is arranged to extend across the rear end of the automobile and is preferably of such length that it may extend beyond both rear fenders 7 of the automobile. Attachment of the bar 5 to the longitudinal members 4 is preferably effected through the employment of extension brackets 8 which, as here shown, are removably secured adjacent their inner ends to the members 4 by J-bolts 9. The outer ends of the brackets are bent or otherwise formed so that they may be readily secured to any intermediate portion of the bar by means of clamps 12. In this manner the same size and shape of bar and brackets may be used on all automobiles, any variation in the distance between the longitudinal members being readily taken care of by the adjustable connection afforded between the bar and brackets.

Positioned on the bar 5 and interposed between the brackets 8 is a second pair of brackets 13 which are adapted to be releasably held on the bar. The brackets 13 are arranged to pivotally carry a carrier rack 14, and are provided with ears 16 through which extend the pivot bolts 17 about which the rack is adapted to swing. Each of the brackets 13 is formed with a recess 18 in which the bar 5 is arranged to fit, bolts 19 serving to firmly clamp the brackets to the bar. It will be noted, by referring to Figure 2, that when the brackets 13 are fitted on the bar the portions of the brackets at the top of recesses 18 rest upon the upper edge of the bar. In this manner there will be no danger of either bracket shifting vertically and thereby distorting the carrier portion of the device.

The rack 14 is preferably interposed between the brackets 13 so as to lie inwardly of the fenders and is arranged to be swung from a vertical or folded position, as illustrated by the full lines in Figure 1, to a horizontal or extended position, as illustrated by the dotted lines. Stops 21 and 22 formed on the brackets and engageable by the sides 23 of the rack, serve to respectively limit the movement of the rack when swung from extended to folded position and vice versa. It will be noted, by referring to Figure 1, that the pivot bolts 17 are positioned to lie slightly above and considerably inwardly of the bar 5, so that when the carrier rack is extended the straight sides 23 thereof may lie over the bar in horizontal position, and a large portion of the rack will lie inwardly of the bar and thereby effect a minimum torsional strain in the bar when the rack is loaded. The stop 22 extends forwardly and rearwardly of the bar and thus provides a large bearing surface for the side member 23 when the rack is extended.

Should it be desired to remove the carrier portion of the device, merely releasing the brackets 13 from the bar permits the rack and brackets to be completely withdrawn; the portion of the device remaining attached to the automobile may thus still continue its function as a bumper.

I claim:

1. In a combined bumper and luggage carrier for automobiles, a bumper bar adapted to be secured to the rear end portion of the automobile and arranged to extend from directly in the rear of one of the automobile's rear fenders to directly in the rear of the other rear fender, and a luggage carrying member pivotally carried on said bar and positioned between the portions of the bumper lying directly rearwardly of the fenders.

2. In a device of the character described, a bumper member adapted to be secured to the rear end portion of an automobile and arranged to extend from directly in the rear of one of the automobile rear fenders to directly in the rear of the other rear fender, and a luggage carrier member pivoted to swing about a horizontal axis located inwardly of said bumper and adapted to lie over said bumper when in extended position.

3. In a device of the character described, a bumper bar adapted to extend across the rear of an automobile, a pair of brackets positioned on said bar intermediate its ends and adapted for securing said bumper to the longitudinal frame members of the automobile, and a luggage carrier rack pivotally carried on said bar and interposed between said brackets.

4. In a device of the character described, a bumper bar arranged to be positioned at the rear end of the automobile and adapted to extend from directly in the rear of one of the rear fenders of the automobile to directly in the rear of the other rear fender, a pair of brackets extending rearwardly from the longitudinal frame members of the automobile and attached to said bumper intermediate the portions lying directly in the rear of said fenders, a second pair of brackets fixed to said bumper intermediate said first brackets, and a luggage carrier rack pivoted to said second brackets for movement about a horizontal axis lying forwardly of said bar.

5. In a device of the character described, a luggage carrier rack adapted to be carried on a bumper bar at an end of the automobile, brackets on said bar pivotally carrying said rack, and means on said brackets for limiting the movement of said rack when swung from a vertical to horizontal position and vice versa.

6. In a device of the character described, the combination with a substantially horizontally disposed rear end bumper bar and a luggage carrier rack arranged to be supported on said bar, a bracket adapted to be adjustably fixed to said bar and on which said rack is pivoted to swing about a horizontal axis lying above and forwardly of said bar relative to the automobile, and means on said bracket for limiting the movement of said rack when swung from a vertical to horizontal position.

7. In a device of the character described, a pair of supporting brackets adapted to be fixed to and to extend rearwardly from the longitudinal frame members of an automobile, a bumper bar adjustably secured to said brackets and arranged to extend across both fenders at the rear of the automobile, a second pair of brackets secured to said bar and arranged intermediate said supporting brackets, and a luggage carrier rack pivotally secured to said second brackets.

8. In a device of the character described, a pair of supporting brackets adapted to be removably fixed to the longitudinal frame members of an automobile, a substantially horizontally disposed bumper bar adjustably secured to said brackets and arranged to extend across both fenders at the rear of the automobile, a second pair of brackets adjustably secured to bar and arranged to be positioned thereon between said first brackets, and a luggage carrier rack pivoted to said second brackets and arranged to swing substantially between said fenders.

In testimony whereof, I have hereunto set my hand at Oakland, California, this 26 day of Jan., 1924.

EDWARD H. SPECHT.